UNITED STATES PATENT OFFICE.

WILLIAM P. CLOTWORTHY, OF BALTIMORE, MARYLAND.

BAKING-POWDER.

SPECIFICATION forming part of Letters Patent No. 265,243, dated October 3, 1882.

Application filed April 6, 1882. (No specimens.)

*To all whom it may concern:*

Be it known that I, WILLIAM PITT CLOTWORTHY, a citizen of the United States, residing in the city of Baltimore, in the State of Maryland, have invented a new and useful Composition of Matter as a Baking-Powder to be Used in Bread-Making, of which composition the following is a specification.

My said invention relates to that class of compounds commonly known as "leavening" or "baking" powders, as a substitute for yeast for aerating dough for the various forms of bread; and it consists in a new mode of adapting diacetate of alumina for eliminating carbonic-acid gas from alkaline carbonates for culinary purposes. Thereby I obtain all the valuable qualities of burnt ammoniated alum, described in my former Letters Patent for improvement in baking-powders, No. 206,930, dated August 13, 1878, with the additional advantage of substituting a vegetable (acetic) acid for a mineral (sulphuric) acid and the formation in the bread, as a residual salt, of the acetate of soda, in place of the bitter salt sulphate of soda. As a necessary consequence of the presence of acetate of soda, preparations of flour and meal in the processes of making bread, cakes, biscuits, and other articles of food of the same class retain their moisture without souring, decomposing, or destroying the nutrient part of the flour or meal.

My composition consists of the following-mentioned ingredients, combined in these proportions, (which proportions I deem the best for general use,) viz: diacetate of alumina, one part; bicarbonate of soda or its chemical equivalent, one part; starch or flour, two parts.

In use I take two tea-spoonfuls of this composition to a pound of flour.

What I claim, and desire to secure by Letters Patent of the United States, is—

As a baking-powder, a compound of diacetate of alumina, bicarbonate of soda or its chemical equivalent, and starch or flour, substantially in the proportions and for the purpose specified.

WILLIAM PITT CLOTWORTHY.

Witnesses:
  WM. V. LOGAN,
  WM. E. GILBERT.